United States Patent
Whelan et al.

(10) Patent No.: US 12,482,370 B1
(45) Date of Patent: Nov. 25, 2025

(54) AI-ASSISTED CLASSROOM MANAGEMENT WITH REAL-TIME OBSERVATIONS, MONITORING AND INTERVENTION

(71) Applicant: RedCritter Corp., Flower Mound, TX (US)

(72) Inventors: Randy M. Whelan, Coppell, TX (US); Erika D. Lambert, Flower Mound, TX (US); Robert M. Beaty, Flower Mound, TX (US); James L. Rockett, Jr., Carrollton, TX (US); Clyde H. Forland, III, Dallas, TX (US)

(73) Assignee: RedCritter Corp., Flower Mound, TX (US)

( * ) Notice: Subject to any disclaimer, the term of this patent is extended or adjusted under 35 U.S.C. 154(b) by 0 days.

(21) Appl. No.: 18/790,184

(22) Filed: Jul. 31, 2024

(51) Int. Cl.
  G09B 5/02 (2006.01)
  G06F 40/40 (2020.01)

(52) U.S. Cl.
  CPC .............. *G09B 5/02* (2013.01); *G06F 40/40* (2020.01)

(58) Field of Classification Search
  CPC ... G09B 5/00; G09B 5/02; G09B 7/00; G09B 7/02
  See application file for complete search history.

(56) References Cited

U.S. PATENT DOCUMENTS

| | | | |
|---|---|---|---|
| 2015/0050623 A1* | 2/2015 | Falash .................... | G09B 7/00 434/362 |
| 2023/0215288 A1* | 7/2023 | Sha ........................ | G09B 19/00 |
| 2024/0273793 A1* | 8/2024 | DeCharms ............... | G09B 5/06 |
| 2024/0404420 A1* | 12/2024 | Bradford .................. | G09B 7/02 |

* cited by examiner

*Primary Examiner* — Robert J Utama
(74) *Attorney, Agent, or Firm* — Kirton McConkie; Brian Tucker (57) ABSTRACT

AI-assisted classroom management with real-time observations, monitoring and intervention is provided. A student AI component can be executed on each student's device to capture the educational content the students are accessing in real-time. The captured content can be evaluated to classify it based on learning standards. The status of each student can then be determined based on the content classifications. The status of the students can be evaluated against configurable rules to generate observations. An observation may be presented to the teacher with one or more suggested actions or one or more actions may be automatically taken to address the observation in real-time.

20 Claims, 9 Drawing Sheets

AI-ASSISTED CLASSROOM MANAGEMENT WITH REAL-TIME OBSERVATIONS, MONITORING AND INTERVENTION

CROSS-REFERENCE TO RELATED APPLICATIONS

N/A

BACKGROUND

A typical classroom has a high student-to-teacher ratio and follows a one-size-fits-all approach. This makes it difficult for teachers to provide individualized attention to the students. As a result, if students are delayed, they are likely to fall further behind. On the other hand, if students are advanced, they will likely become bored and may lack opportunities to excel. Even when teachers are not overloaded, they oftentimes lack resources to maximize the learning experience for each student. Such problems exist even though there are many educational systems and resources available in the classroom.

BRIEF SUMMARY

Embodiments of the present disclosure are generally directed to AI-assisted classroom management with real-time observations, monitoring and intervention. A student AI component can be executed on each student's device to capture the educational content the students are accessing in real-time. The captured content can be evaluated to classify it based on learning standards. The status of each student can then be determined based on the content classifications. The status of the students can be evaluated against configurable rules to generate observations. An observation may be presented to the teacher with one or more suggested actions or one or more actions may be automatically taken to address the observation in real-time.

In some embodiments, an educational system may implement a method for AI-assisted classroom management with real-time observations, monitoring and intervention. Content may be captured on students' devices during an observation session. The captured content for each of the students may be evaluated in accordance with a learning standard to detect a learning standard classification of the captured content for each of the students. A status for each of the students may be generated by comparing the learning standard classification of the captured content for each of the students to a learning standard classification specified for the observation session. The status for each of the students may be evaluated against one or more rules. Based on the evaluation, an observation may be generated. An action associated with the observation may be triggered.

In some embodiments, computer storage media may store computer executable instructions which when executed implement a method for AI-assisted classroom management with real-time observations, monitoring and intervention. A student AI component can be executed on students' devices to capture content during an observation session. A large language model can be used to evaluate the captured content for each of the students in accordance with a learning standard to detect a learning standard classification of the captured content for each of the students. A status for each of the students may be generated by comparing the learning standard classification of the captured content for each of the students to a learning standard classification specified for the observation session. Based on the status, one or more observations may be presented to a teacher in a teacher AI interface. Each of the one or more observations may include one or more actions.

In some embodiments, an educational system may implement a method for AI-assisted classroom management with real-time observations, monitoring and intervention. Content may be captured on students' devices during an observation session. The captured content for each of the students may be evaluated in accordance with a learning standard to detect a learning standard classification of the captured content for each of the students. A status for each of the students may be generated by comparing the learning standard classification of the captured content for each of the students to a learning standard classification specified for the observation session. The status for each of the students may be evaluated against one or more rules. Based on the evaluation, an observation may be generated. It may be determined that an autopilot mode is on. An action may be automatically taken to address the observation by interfacing with a student AI component on one or more of the students' devices.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

These drawings depict only example embodiments and should not be considered limiting of the scope of the disclosed embodiments.

DETAILED DESCRIPTION

In this specification and the claims, the term "school" will be used to represent any educational or learning institute that may use one or more educational systems that implement embodiments of the present disclosure. The terms "student" and "teacher" should be given their ordinary meaning. The term "classroom" may generally be given its ordinary meaning but should also encompass equivalent groups of students in online learning environments. The term "educational system" will be used to represent a software system used in a school for educational purposes. An example of an educational system is RedCritter's CritterCoin.

Figure 1:
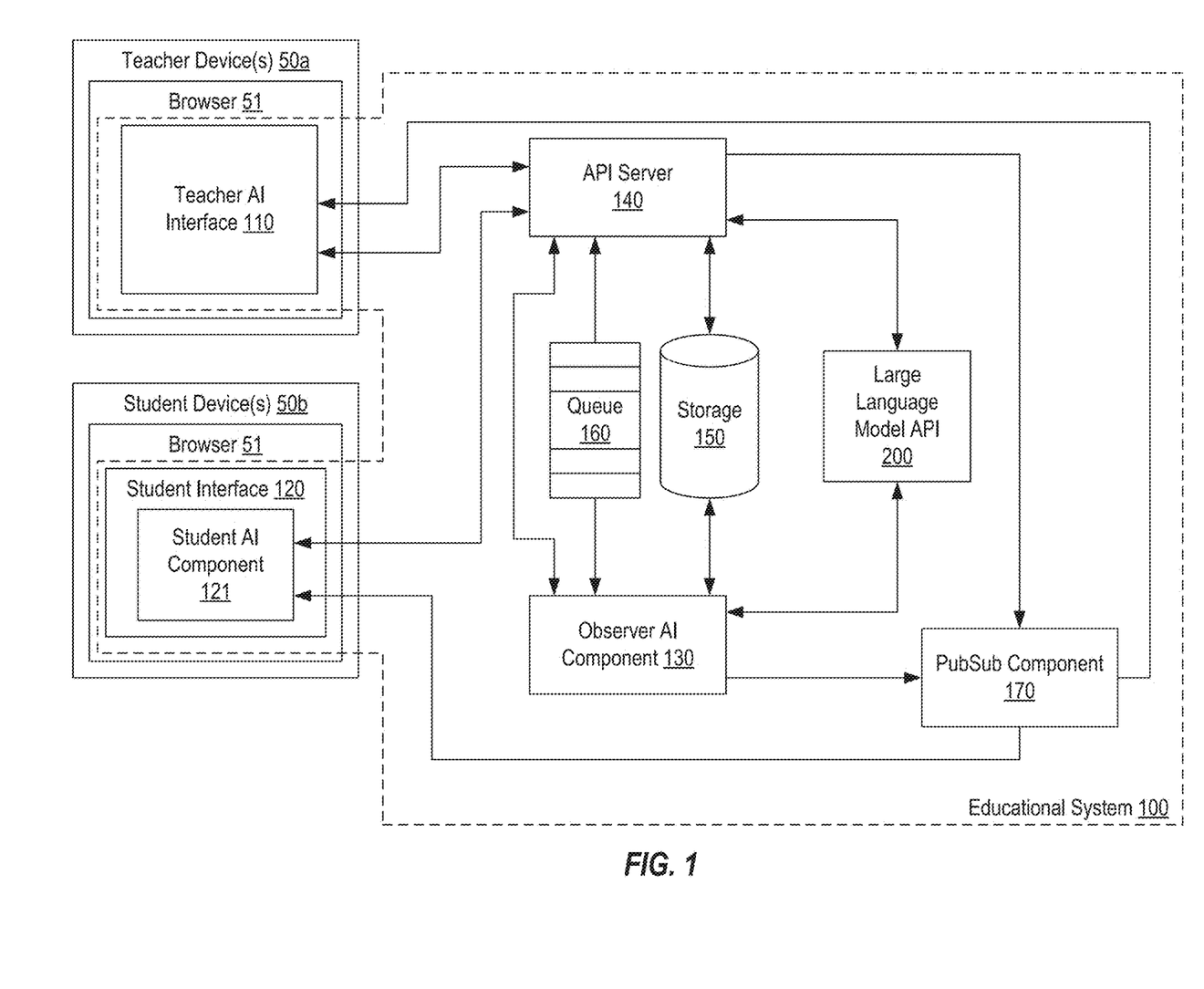
FIG. 1 illustrates an example computing environment in which one or more embodiments may be implemented.

FIG. 1 provides an example of an educational system 100 that may be used to implement one or more embodiments of the present disclosure. As shown, in some embodiments, educational system 100 may include a teacher artificial intelligence (AI) interface 110, a student interface 120 that includes (or is associated with) a student AI component 121, an observer AI component 130, an application programming interface (API) server 140, storage 150, a queue 160 and a publish-subscribe (PubSub) component 170. Educational system 100 may also interface with a large language model API 200 to leverage a large language model to implement some of the functionality described herein.

As depicted, teacher AI interface 110 and student interface 120 are browser-based (e.g., webpages) and may be accessed via a browser 51 on teacher device(s) 50a and student device(s) 50b respectively (or generally user devices 50). User devices 50 can represent any computing device that a user may use to interface with educational system 100. For example, a user device 50 may be a desktop, laptop, tablet, smart phone, virtual reality headset, television, etc. In typical implementations, there may be many schools that use educational system 100, and therefore, there may be many user devices 50 that users associated with such schools use to access educational system 100. In other embodiments, however, educational system 100 may provide teacher AI interface 110 and/or student interface 120 as part of a dedicated application (e.g., a desktop or mobile application).

In some embodiments, student interface 120 could be provided as part of educational system 100 (e.g., student interface 120 could represent webpages of RedCritter's CritterCoin system). However, student interface 120 could be or could include any other interface such as third-party webpages or apps. In other words, embodiments of the present disclosure encompass any scenario where a student uses user device 50 to perform learning activities.

In some embodiments, student AI component 121 can represent the portions of student interface 120 that implement the functionality described herein. In other embodiments, student AI component 121 could be separate from student interface 120 (e.g., a dedicated service, a separate application, etc.). As one particular example, student AI component 121 could be a browser extension.

In some embodiments, teacher AI interface 110 could represent one or more webpages (e.g., a dashboard) that educational system 100 provides to a teacher to allow the teacher to leverage the functionality of embodiments of the present disclosure.

Observer AI component 130 may typically be hosted on a server (e.g., in the cloud or on a dedicated server hardware device) but could be hosted in any suitable way. Each of teacher AI component 110, student AI component 120 and observer AI component 130 may be configured to interface with API server 140 to invoke and/or implement the functionality described herein and may be configured to interface with PubSub component 170 for intercommunication.

API server 140, queue 160 and PubSub component 170 may be hosted anywhere that is accessible to the various components of educational system 100 such as in the cloud. In this context, the term API should be construed broadly as encompassing an interface for receiving any type of communication for performing the functionality described herein. Likewise, the term API server should be construed as encompassing any service that is capable of performing the functionality described herein. The term "PubSub" should be given its ordinary meaning such as middleware for enabling communications published by publishers to be delivered to subscribers. However, educational system 100 could use other communication patterns for enabling the communications described herein.

Storage 150 can represent any type or number of storage mechanisms for storing the data that educational system 100 may use or create. For example, storage 150 may include relational databases, object storage, indexes, file systems, etc. As with the other components, storage 150 can be hosted in the cloud, implemented on dedicated hardware or provided in any other suitable manner.

Large language model API 200 can represent any suitable mechanism by which educational system 100 may access a large language model such as BERT, Gemini, GPT-4, etc. As described in detail below, observer AI component 130 and API server 140 may leverage a large language model via LLM API 200 to facilitate AI-assisted classroom management with real-time observations, monitoring and intervention.

Figure 2:
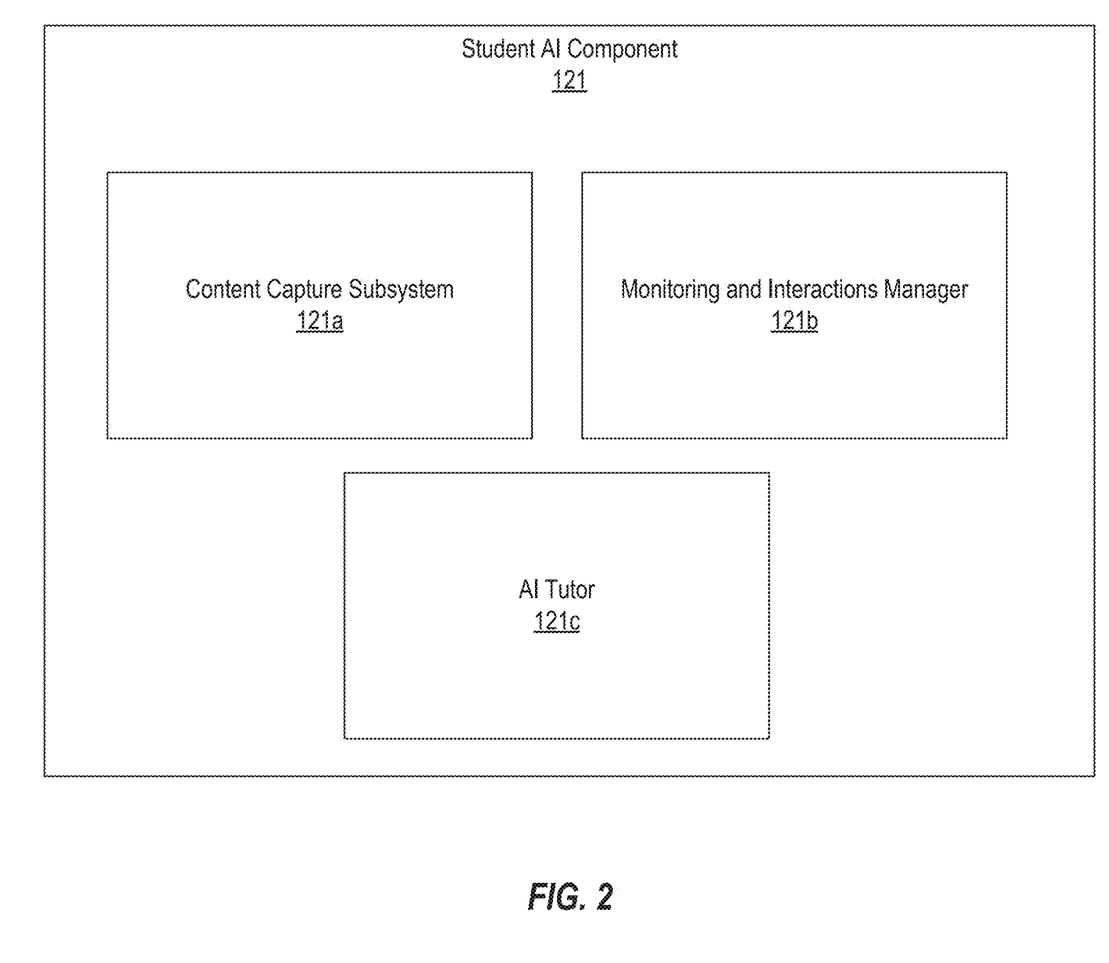
FIG. 2 illustrates an example of a student AI component that is configured in accordance with one or more embodiments.

FIG. 2 provides an example of how student AI component 121 could be configured in one or more embodiments. In general, student AI component 121 is configured to detect/report a student's engagement and to coordinate with teacher AI interface 110 to keep the student on task. As shown, student AI component 121 may include a content capture subsystem 121a, a monitoring and interactions manager 121b and an AI tutor 121c. Content capture subsystem 121a can be configured to capture different types of content such as by taking screenshots of the student's screen (or at least of browser 51's window or whatever interface is relevant) at regular intervals (e.g., every five minutes), retrieving metadata and/or transcripts of videos that the student watches (e.g., within student interface 120 or otherwise), capturing audio that the student is listening to, etc. Student AI component 121 can send this content to API server 140 to facilitate determining what the student is doing on user device 50 at a particular time.

Monitoring and interactions manager 121b can be configured to monitor a student's interactions and to encourage or facilitate certain interactions. For example, in some embodiments, monitoring and interactions manager 121b may monitor a document object model (DOM) of a webpage that is currently loaded in browser 51 (or an equivalent structure in other scenarios). By monitoring the DOM, monitoring and interactions manager 121b can detect relevant student interactions such as by detecting the student's answers to questions presented in student interface 120. In some embodiments, monitoring and interactions manager 121b may also be configured to detect DOM events based on specific learning websites or e-textbooks to thereby be able to understand the page structure and/or questions contained therein. By making such detections, monitoring and interactions manager 121b can intelligently inject user interface elements to facilitate the student's use of such resources (i.e., the resources made available within student interface 120). One example includes injecting dropdown menus for each paragraph or question in the content of the learning website or e-textbook to provide the student with options of "get more information," "summarize," "outline," or "practice more like this" for each paragraph or question. When such options are selected, student AI component 121 can interface with API server 140 appropriately such as to request additional content or practice problems specific to the associated paragraph or question (e.g., by using LLM API 200 in the manner described below to retrieve additional practice problems pertaining to the current learning standard classification). Student AI component 121 can also be configured to receive and implement instructions it receives from teacher AI component 111 and observer AI component 130 including those described below.

AI tutor 121c can function as a tutor based on guidance received from teacher interface 110 and/or observer AI component 130 as described in detail below. AI tutor 121c may leverage monitoring and interactions manager 121b in some embodiments.

Figure 3:
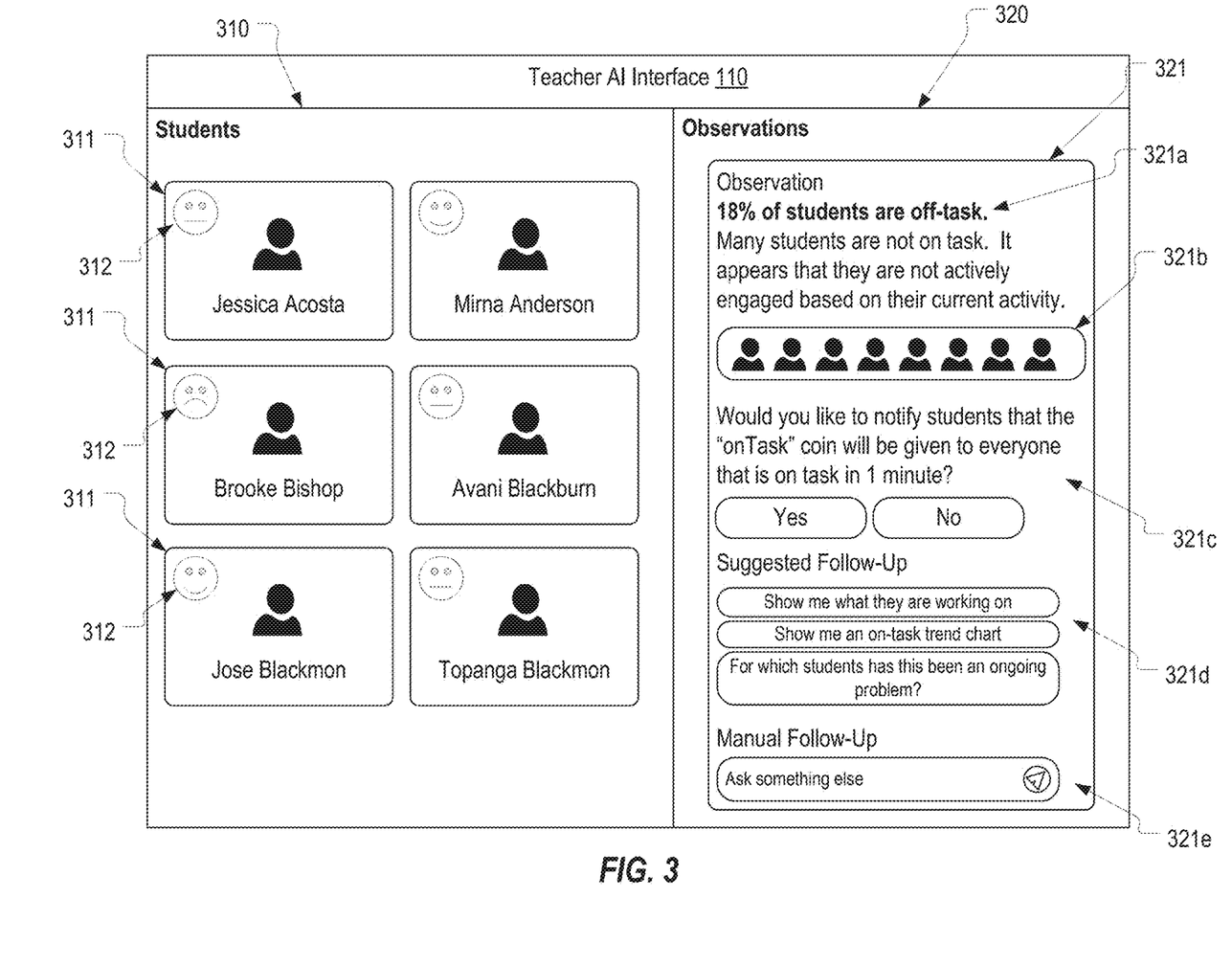
FIG. 3 illustrates an example of a teacher interface that is configured in accordance with one or more embodiments.

FIG. 3 provides an example of how teacher AI interface 110 may appear to a teacher in one or more embodiments. As shown, teacher AI interface 110 may include a students section 310 in which a teacher's students may be represented. For example, students section 310 includes a student representation 311 for each student. A student representation 311 may include a picture and the name of the student and a student engagement representation 312 (e.g., one of a smiling emoji representing full engagement, a neutral emoji representing inadequate engagement or a frowning emoji representing no engagement). The status of student engagement representations 312 can be based on the reports from the instances of student AI component 121 on the students' user devices 50 and can therefore accurately represent whether a student is currently engaged with the appropriate content as further described below. The use of AI for this purpose allows the teacher to quickly determine with accuracy when students have disengaged from the lesson or other learning material that they should be doing.

Teacher AI interface 110 also includes an observation section 320 in which one or more observation representations 321 may be displayed. A wide variety of observations could be defined and/or generated using the architecture of educational system 100.

As shown in the depicted example, an observation representation 321 could include an identification 321a of the observation such as off-task students. An observation may be determined/generated using AI based on the reports from student AI component 121. Identification 321a could also define the number or percentage of students to whom the observation applies. In this case, identification 321a indicates that "18% of students are off-task."

An observation representation 321 could also include visual representations 321b of the students to whom the observation applies. In this example, visual representations 321b are in the form of pictures of the 18% of the students who are off-task.

An observation representation 321 could also include a recommended action 321c for this observation and options that the teacher can select to accept or decline the recommendation (e.g., with a single click). A recommended action 321c could be manually configured or determined/generated using AI such as by leveraging machine learning to learn which actions are most effective at causing the students to return on task. In this example, the recommended action 321c is to offer the "onTask" coin or reward to all students who are on task in 1 minute.

An observation representation 321 could also include one or more suggested follow-ups 321d that the teacher can select to further evaluate the observation. Suggested follow-ups 321d could be manually configured or determined/generated using AI such as machine learning. The selection of a suggested follow-up 321d could result in the display of additional information and/or actions which may be manually configured or determined/generated using AI.

An observation representation 321 could also include a manual follow-up option 321e by which the teacher may manually send instructions, encouragement, or other content to selected student(s) and/or to an AI tutor for the selected student(s).

The structure and content of teacher AI interface 110, which are AI-driven, enables teachers to quickly assess classroom dynamics, identify students needing attention, and take immediate action to support learning objectives. By leveraging AI in the manner described below, these things are accomplished and remain effective regardless of the size of the classroom.

FIGS. 4A-4F provide an example of how educational system 100 may implement AI-assisted classroom management with real-time observations, monitoring and intervention in one or more embodiments.

Figure 4A:
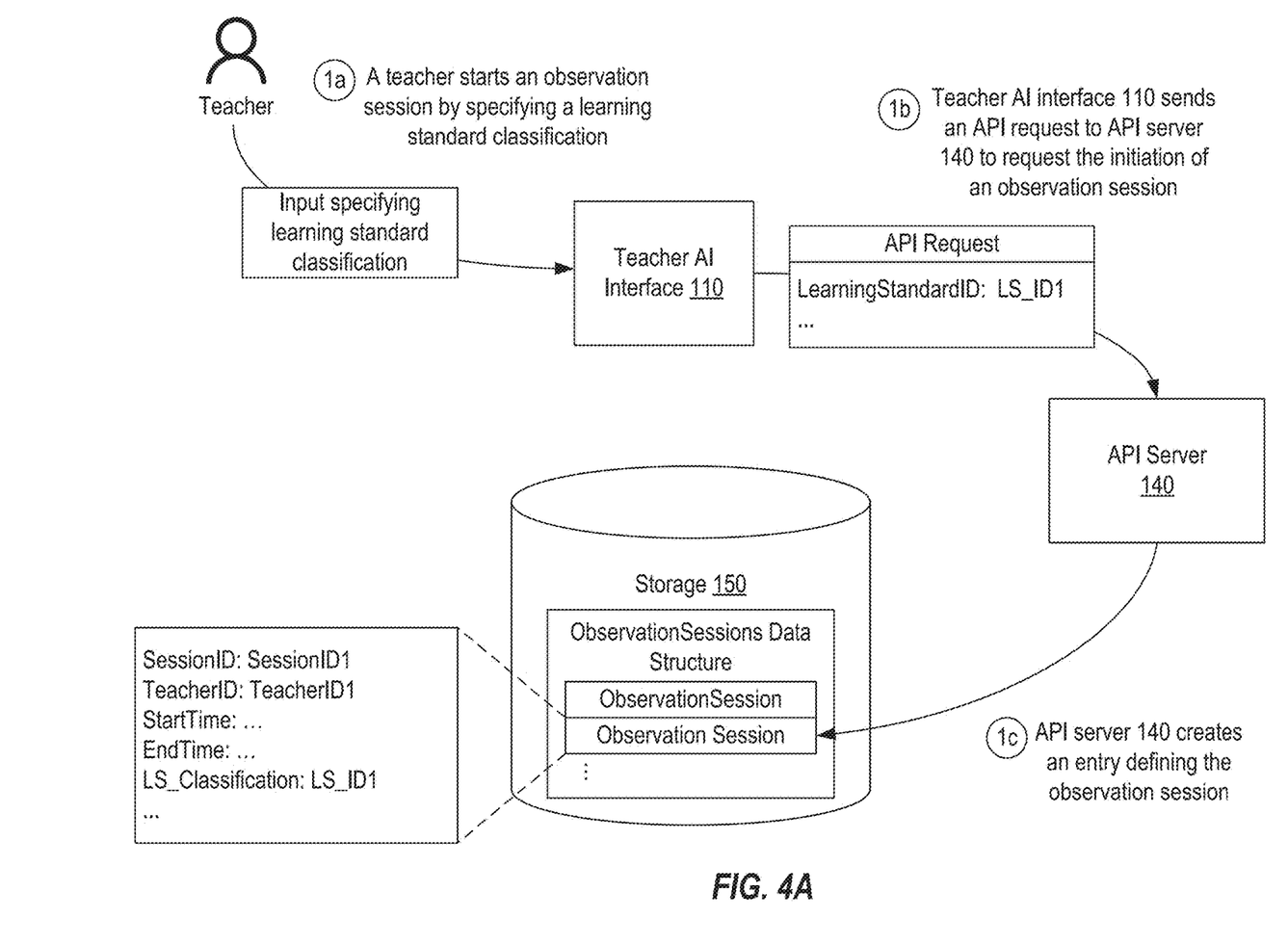
FIGS. 4A-4F provide an example of how AI-assisted classroom management with real-time observations, monitoring and intervention may be implemented in one or more embodiments.

FIG. 4A represents how a teacher can start an observation session for a group of students (e.g., for the classroom). As represented in step 1a, the teacher may use teacher AI interface 110 (or possibly some other interface) to request that an observation session be started by specifying a learning standard classification, among possibly other things like the duration of the observation session, particular students who should be included (e.g., if less than the entire class will participate in the session), etc. In step 1b, teacher AI interface 110 can send a corresponding API request to API server 140 to request the initiation of the observation session. As shown, this API request can specify an identifier of the learning standard classification that the teacher selected (LS_ID1). Examples of learning standards include the common core and state-specific standards, but any learning standard for which the LLM is trained could be used. The term "learning standards classification" should be construed as a particular standard (or section) within the learning standards (e.g., CCSS.ELA-LITERACY.RL.5.1 within the Common Core). In step 1c, API server 140 can start the observation session by creating an entry defining the observation session and storing it in an observation sessions data structure in storage 150 for subsequent access and use. An observation session entry can define a unique identifier for the observation session, the learning standard classification (or classifications), a start and end time for the observation session, one or more identifiers for determining which classroom is involved (e.g., identifiers of the teacher and school), among possibly other information.

In conjunction with initiating the observation session, the teacher could also provide instructions to the students who will be observed during the observation session. For example, if the observation session is scheduled to run for 30 minutes, the teacher could instruct the students to use student interface 120 for the next 30 minutes to perform learning activities consistent with the specified learning standard classification. In some embodiments, API server 140 could interface with student AI component 121 to prompt the students to begin performing learning activities. In short, any suitable technique or mechanism can be employed to inform or prompt the students to engage in learning activities consistent with the learning standard classification specified for the observation session.

Figure 4B:
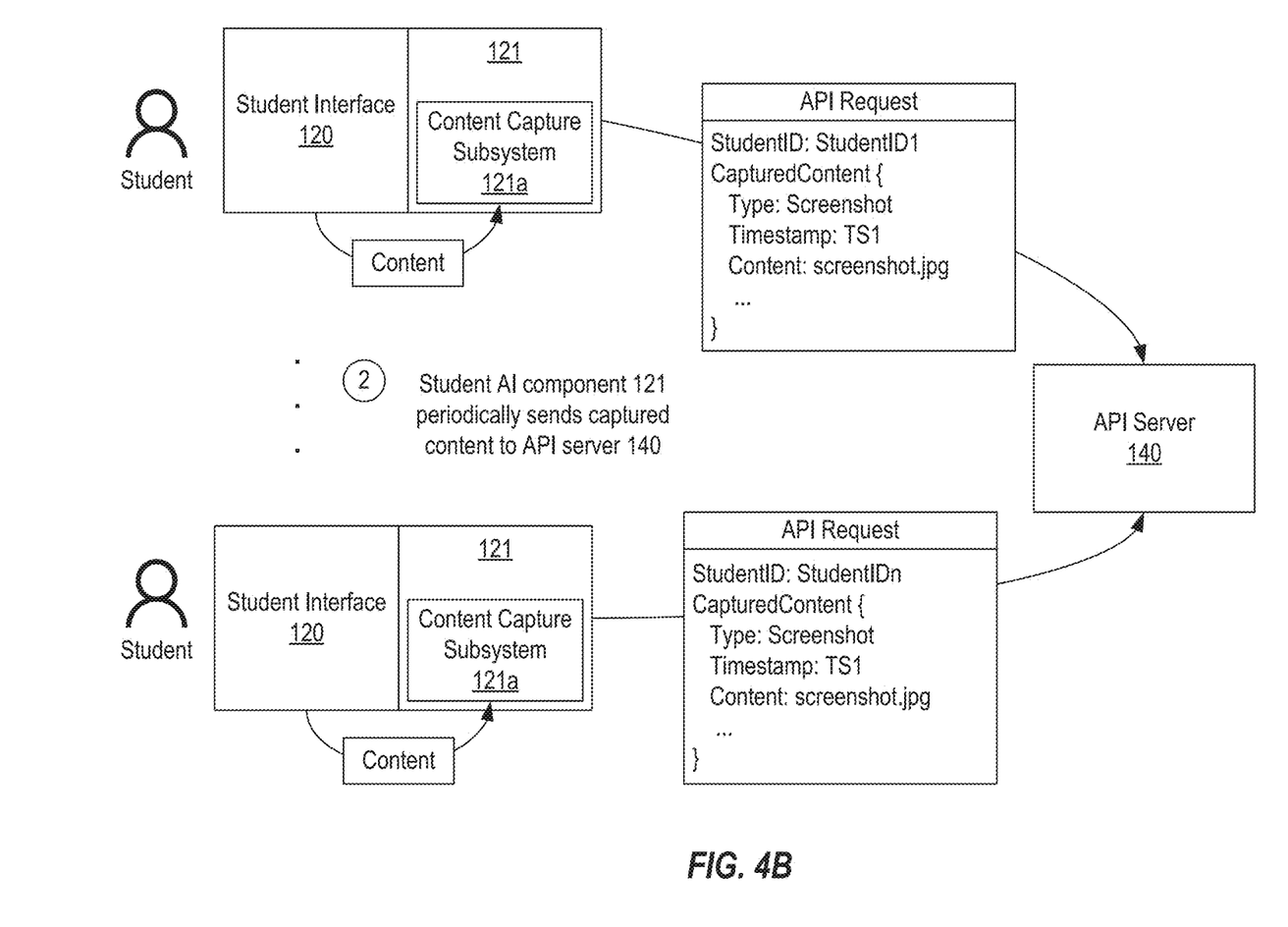

FIG. 4B represents functionality that student AI component 121 may perform during an observation session. As represented as step 2, student AI component 121 can use content capture subsystem 121a to periodically capture content of/in student interface 120 (or possibly other interface(s) on the student's user device 50b) and can send an API request containing the content to API server 140. As described above, this content can be screen captures, video metadata, etc. These reports of the content could identify the corresponding student, a type of the content, a timestamp defining when the content was captured, and the content itself, among possibly other things.

In some embodiments, API server 140 could instruct student AI component 121 to commence this content capturing and reporting as part of the initialization of the observation session. In other embodiments, student AI component 121 could always perform this content capturing and reporting regardless of whether an observation session is active.

Figure 4C:
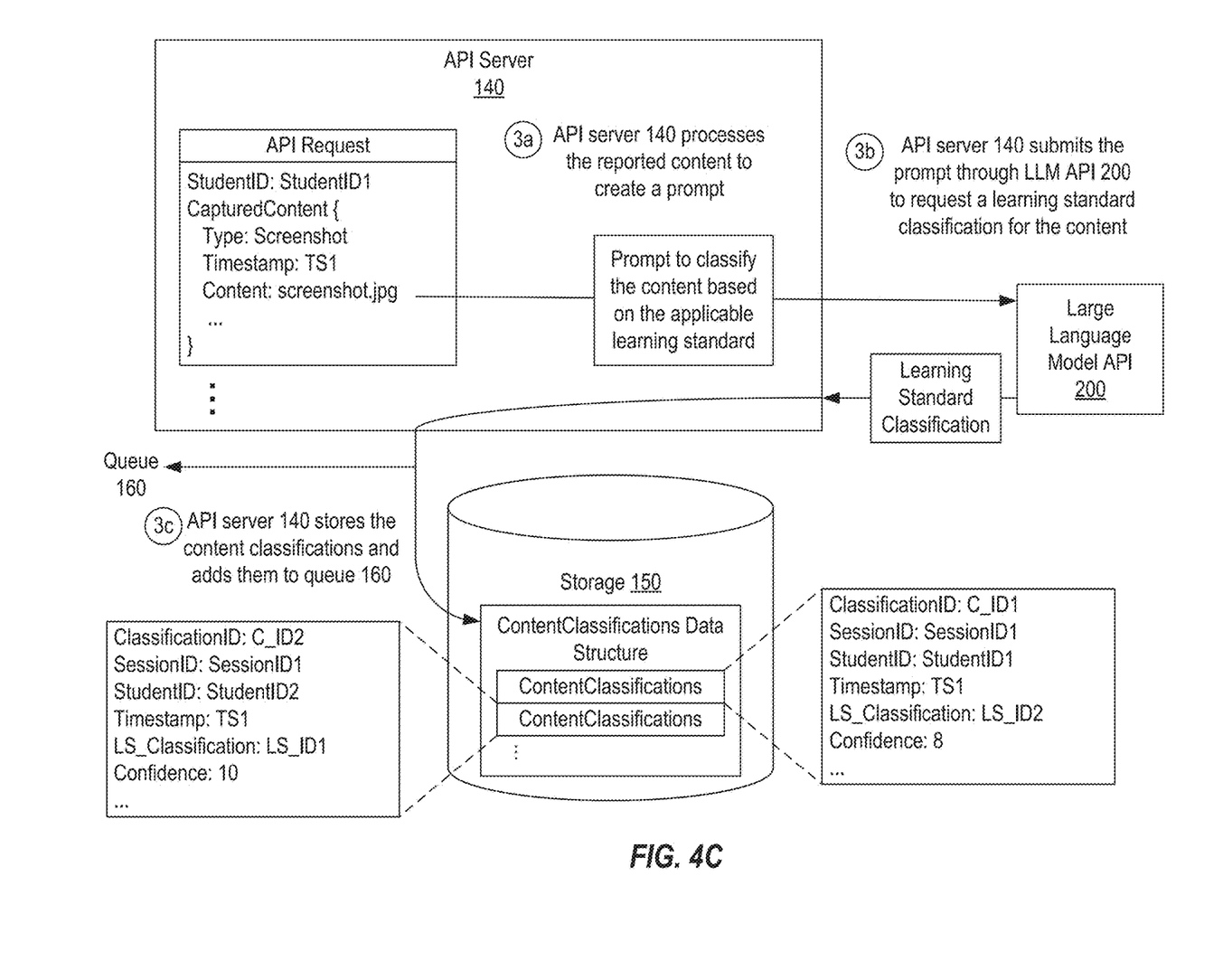

FIG. 4C represents how API server 140 can process content it receives from student AI components 121 during an observation session. Accordingly, the functionality represented in FIG. 4C can be performed on an ongoing basis during an observation session. In step 3A, API server 140 can process the content received from a student AI component 121 to create a prompt suitable for LLM API 200. For example, if the content is a screenshot, API server 140 could use optical character recognition techniques to extract text from the image and could then format the prompt to include instructions to request classification of the text in accordance with the applicable learning standard (e.g., "identify which learning standard of the Common Core the following text covers: . . . "). This processing can also include identifying relevant text from the content to ensure that the prompt is configured to best obtain an accurate response. In step 3b, API server 140 can submit each prompt to receive the predicted learning standard classification for the corresponding content along with possibly a confidence score for the prediction. In step 3c, API server 140 can store the content classifications in storage 150 for subsequent use and may also add the content classifications (or at least references to them) to queue 160 to facilitate real-time handling as described below.

Storage 150 (and/or queue) may maintain a content classifications data structure in which content classifications can be stored. In some embodiments, a content classification can include a unique identifier of the content classification, the corresponding session and student IDs, the timestamp for when the content was captured, the predicted learning standard classification and the confidence score for the prediction. Accordingly, as the session progresses, API server 140 may create and store multiple content classifications for each student to thereby define what the student was likely doing during the session. The example in FIG. 4C shows that, at time TS1, the students having IDs of StudentID1 and StudentID2 were determined to be engaged with content pertaining to learning standards having classifications of LD_ID1 and LS_ID2 respectively. In some cases, a content classification may not identify any learning standard classification. For example, if the student is not on a website that has educational content, the LLM may not predict a learning standard classification from any text of the screenshot and therefore a content classification may not identify any learning standard (e.g., by setting the LS_Classification member to null).

Figure 4D:
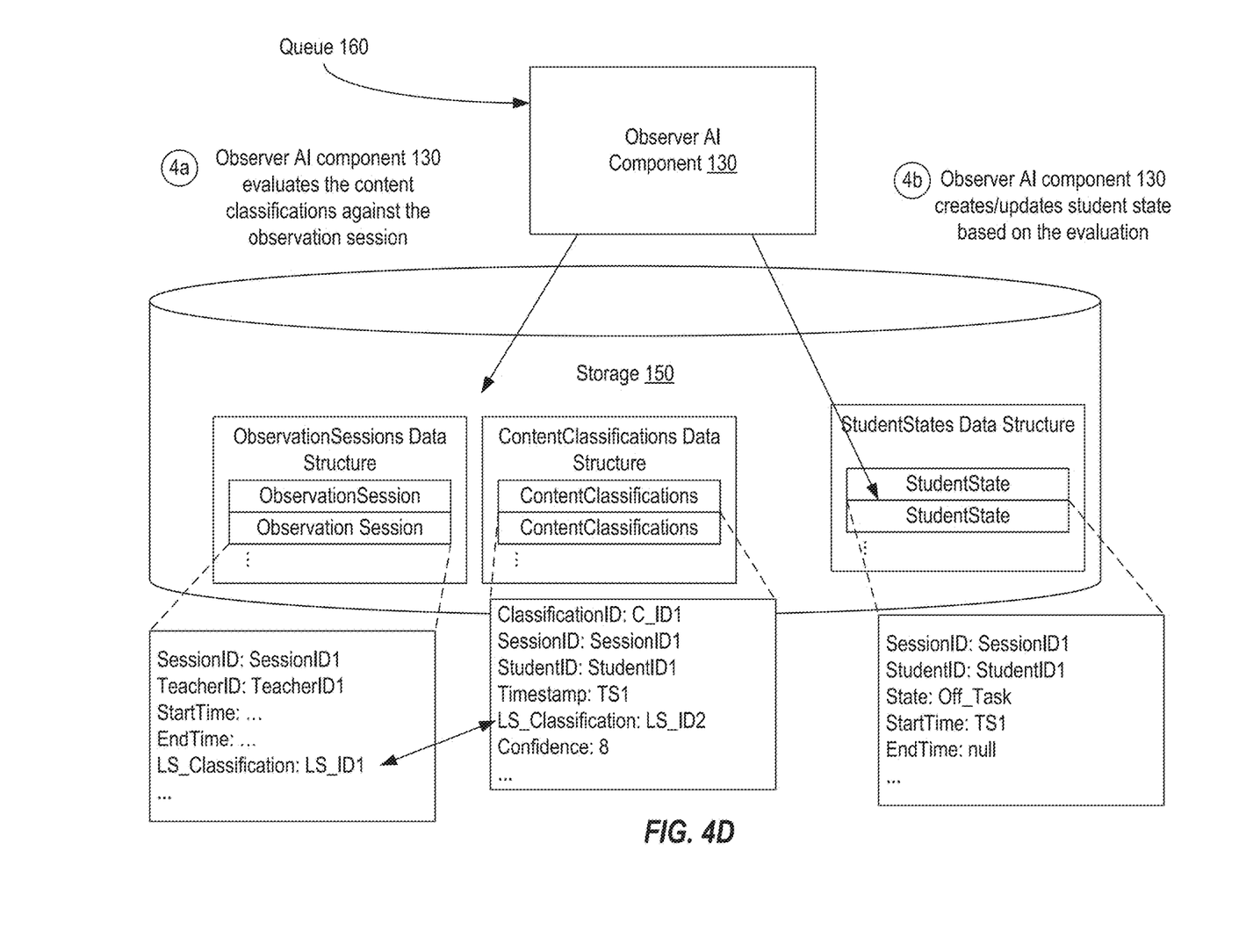

FIG. 4D provides an example of how observer AI component 130 can leverage the content classifications to determine and track whether the students are on task during the observation session. In some embodiments, observer AI component 130 may be configured to perform the functionality represented in FIG. 4D whenever API server 140 creates a content classification. This real-time handling of the content classifications can be facilitated by leveraging queue 160. In other embodiments, observer AI component 130 could perform this functionality periodically, on demand, or at any other time.

As represented in step 4a, observer AI component 130 can evaluate a content classification against the corresponding (e.g., by session ID) observation session to determine whether the corresponding student is on task. For example, observer AI component 130 may compare the predicted learning standard classification defined in the content classification to the learning standard classification defined in the corresponding observation session. In step 4b, observer AI component 130 can create or update the corresponding student's state based on this evaluation. Continuing the example from above, because the LLM predicted that StudentID1 at TS1 was engaged with learning content pertaining to LS_ID2 rather than learning content pertaining to LS_ID1 as the teacher instructed, observer AI component 130 may create (or update) a student state entry in a student states data structure to define the student's state as "off task" beginning at TS1 (which assumes the student had previously been on task for which a separate entry in student states data structure could have been previously created). As the observation session proceeds and additional content classifications are created, observer AI component 130 can update this entry appropriately. In this way, the entries in student states data structure can be leveraged to determine in real-time whether each student is on task. In some embodiments, a student's state could be defined using more than the binary on task or off task. For example, the state could define a value of "off task but engaged in learning activities" and/or other values as desired.

Figure 4E:
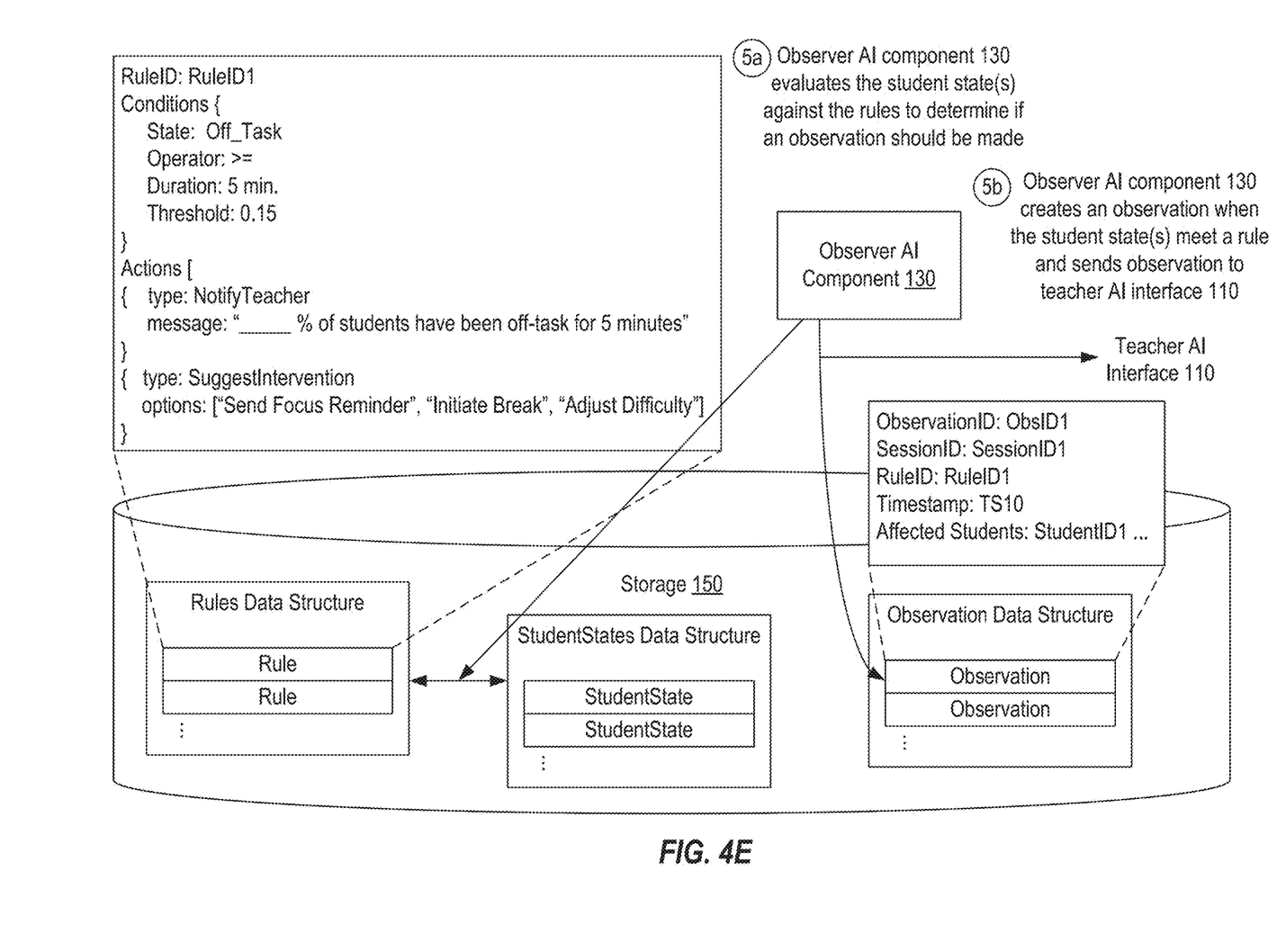

FIG. 4E provides an example of how observer AI component 130 can make observations during an observation session. In some embodiments, observer AI component 130 could perform the functionality represented in FIG. 4E on a continuous basis. Although FIG. 4E shows the various data structures residing in storage 150, these data structures (or at least the relevant portions) can be loaded into the memory of observer AI component 130 to facilitate real-time observation.

In step 5a, observer AI component 130 can evaluate the student state(s) against each applicable rule to determine if an observation should be made. For example, an administrator or teacher could define rules where each rule associates student state conditions with one or more actions. In the depicted example, the conditions specify that the rule is met when 15% (threshold condition) of students have been off track (state condition) for at least (operator condition) 5 minutes (duration condition). The actions include notifying the teacher with an appropriate message and suggesting interventions. A variety of rules could be defined including those that apply to a single student.

It is assumed that the student states meet the conditions specified in the depicted rule. For example, observer AI component 130 could evaluate each student state associated with SessionID1 to determine that at least 15% of them define an off-task state that has a start time that is at least 5 minutes before the current time and no end time. Therefore, in step 5b, observer AI component 130 could create an observation in an observation data structure. An observation can include a unique ID (Obs_ID1), the corresponding session ID, the ID of the rule that was triggered (RuleID1), a timestamp for the creation of the observation, and an identification of the affected students (e.g., their student IDs or names), among possibly other information.

In conjunction with creating and storing the observation in step 5b, observer AI component 130 can also send the observation to teacher interface 110 via PubSub component 170. Teacher AI interface 110 can then present the observation to the teacher, such as is represented in FIG. 3. For example, identification 321a could be based on the message parameter of the corresponding rule, visual representations 321b could be generated based on the affected students defined in the observation, and recommended action 321c could be based on an action defined in the corresponding rule or an AI-generated action. In this manner, the teacher can be given real-time observations and can take quick and effective action.

Figure 4F:
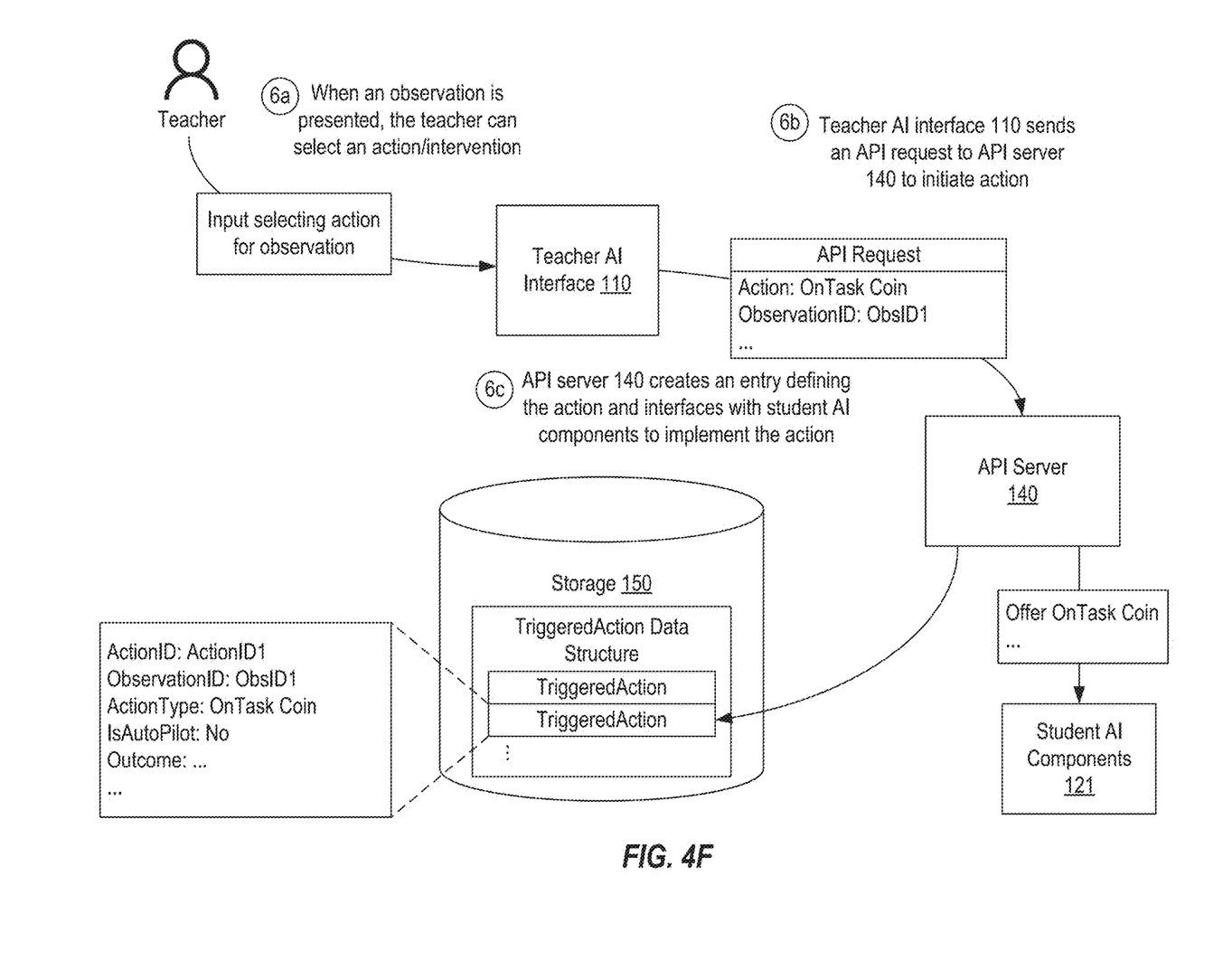

FIG. 4F provides an example of how a selected action (or intervention) can be handled. In this figure, it is assumed that the observation shown in FIG. 3 has been presented to the teacher. In step 6a, it is assumed that the teacher selects the recommended action/intervention of offering the onTask coin to each student that is on task in one minute. In response, and as represented as step 6b, teacher AI interface 110 can send an API request to API server 140 to initiate the selected action. This API request could identify the selected action and the observation with which it is associated. Although not shown, API server 140 can access the identified observation to determine how to implement the selected action. Then, in step 6c, API server 140 can create an entry defining the action and interface with each applicable student AI component 121 (e.g., via PubSub component 170) to implement the action. In this example, because the action is offering the onTask coin, the action can be presented to each student. However, in some cases, an action may only apply to some students. Many different types of actions/interventions can be defined.

As the actions are implemented, student AI component 121 can continue to capture content and monitor the student's interactions so that it can be determined if the action was successful (e.g., by determining whether offering the onTask coin caused the students to get on task). For example, as API server 140 continues to create content classifications, observer AI component 130 can evaluate the content classifications and may define an outcome for the action. In other words, the functionality represented in FIGS. 4B-4F can be performed on an ongoing basis to constantly adapt the learning experience for each student or group of students.

As represented in FIG. 4F, in some embodiments, each triggered action entry may include an outcome parameter which can be used to store the outcome (e.g., the percentage of students who remained off task after the action was implemented). By determining and storing such outcomes, educational system 100 can leverage AI (e.g., machine learning) to determine which actions are most effective for a particular observation. In this way, educational system 100 can recommend the most effective actions for a particular classroom, teacher, student, etc.

In some embodiments, teacher AI interface 110 can provide an autopilot feature. When the autopilot feature is enabled, observer AI component 130 can automatically trigger an action when an observation is made. The action that may be taken could be predefined (e.g., by a teacher) or could be determined using AI as suggested above. When an action is automatically taken during autopilot mode, the action entry may include an indication as is represented in FIG. 4F. By distinguishing between actions that are automatically taken and those that are teacher selected, educational system 100 can better leverage AI to recommend the best actions for a given observation.

In some embodiments, an action or instruction may be directed to AI tutor 121c. For example, the teacher may use teacher AI interface 110 to trigger an action or to send a message to the instance of AI tutor 121c of a particular student's student AI component 121 to cause the AI tutor 121c to perform the action, instruct the student, etc. Likewise, observer AI component 130 could automatically instruct AI tutor 121c to take a particular action in response to an observation. Examples of actions AI tutor 121c may take include redirecting the student's browser 51 to appropriate content (e.g., to a URL specified by the teacher in the manual follow-up option 321e of teacher AI interface 110), increasing the difficulty of learning content presented to the student as described in further detail below, prompting the student to perform a specific learning activity (e.g., to focus on a specific topic or skill specified by the teacher or automatically determined from the student's historical data using AI), providing an explanation for a correct answer, a hint for answering a question correctly, or other guidance for the current learning material, injecting learning material or options for accessing learning material (e.g., via monitoring and interactions manager 121b), offering a reward to the student for particular conduct, etc.

As suggested above, in some embodiments, AI tutor 121c may be leveraged to adaptively increase the difficulty of learning material presented to a student. For example, as the student's interactions are monitored and evaluated as described above, observer AI component 130 could determine (i.e., make an observation) that the student's performance is exceeding expectations (e.g., by comparing the student's performance on a quiz as detected by monitoring and interactions manager 121b to a defined rule). When it detects overperformance, observer AI component 130 could create an observation as described above which in turn will prompt the teacher to approve the action which in this case is an increase in the difficulty for the student (or the action could be automatically approved if autopilot is on). The student's performance could continue to be monitored as described above to determine if an additional increase in difficulty is warranted.

In summary, the technical configuration of educational system 100 facilitates real-time feedback and intervention which can minimize the occurrence of gaps in a student's understanding, avoid missed opportunities for reinforcing positive behavior, and maximize student engagement and motivation. Likewise, the manner in which educational system 100 leverages AI ensures that the most effective learning resources can be made availability to the teacher and presented to the individual students to thereby more closely approximate one-on-one teaching. The technical configuration of educational system 100 also provides these benefits in a scalable manner.

Embodiments of the present disclosure may comprise or utilize special purpose or general-purpose computers including computer hardware, such as, for example, one or more processors and system memory. Embodiments within the scope of the present disclosure also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general-purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, smart watches, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present disclosure can be hosted in a cloud environment.

The present disclosure may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, implemented by an educational system, for AI-assisted classroom management with real-time observations, monitoring and intervention, the method comprising:
   receiving, via a teacher AI interface of the educational system, a request to initiate an observation session, the request specifying a learning standard classification of a learning standard for the observation session;
   in response to the request, capturing, by a student AI component of the educational system that is executed on each of a plurality of student devices, content on the respective student device during the observation session, wherein capturing the content on the respective student device comprises capturing screenshots;
   sending, by the student AI component executed on each of the plurality of student devices, an application programming interface (API) request containing the captured content to an API server:
   evaluating, by the API server, the captured content for each of the students in accordance with a learning standard to define a learning standard classification of the captured content for each of the students, wherein evaluating the captured content for each of the students comprises extracting text from the screenshots, creating a prompt containing the extracted text and instructions requesting a classification of the extracted text in accordance with the learning standard, submitting the prompt to a large language model (LLM), and receiving, from the LLM, the classification of the extracted text in accordance with the learning standard, and wherein defining the learning standard classification of the captured content for each of the students comprises defining the learning standard classification of the captured content for each student based on the respective classification of the extracted text received from the LLM;
   generating a status for each of the students by comparing the learning standard classification of the captured content for each of the students to the learning standard classification specified for the observation session;
   evaluating the status for each of the students against one or more rules;
   based on the evaluation, generating an observation; and
   triggering an action associated with the observation.

2. The method of claim 1, wherein generating the status for each of the students by comparing the learning standard classification of the captured content for each of the students to the learning standard classification specified for the observation session comprises:
   generating an on task status for each student for which the learning standard classification of the captured content matches the learning standard classification specified for the observation session; and
   generating an off task status for each student for which the learning standard classification of the captured content does not match the learning standard classification specified for the observation session.

3. The method of claim 1, wherein evaluating the status for each of the students to one or more rules comprises evaluating whether the status for each of the students meets one or more conditions specified in the one or more rules.

4. The method of claim 3, wherein the one or more conditions include a condition defining a number of students who are off task.

5. The method of claim 1, further comprising:
   presenting the observation to a teacher; and
   receiving input from the teacher that selects the action, wherein the action is triggered in response to the input.

6. The method of claim 1, wherein the action is triggered automatically in response to the observation being generated.

7. The method of claim 1, further comprising:
   presenting a teacher interface in which representations of the students are displayed; and
   updating the representations of the students based on the status.

8. The method of claim 1, further comprising:
   receiving input at the teacher interface that selects one of the representations that pertains to a first student; and
   presenting additional information about the status of the first student.

9. The method of claim 8, wherein the additional information about the status of the first student includes the captured content for the first student.

10. The method of claim 1, wherein the action comprises interfacing with an AI tutor on one or more of the students' devices.

11. The method of claim 10, wherein interfacing with the AI tutor comprises causing the AI tutor to redirect a student interface to content corresponding to the learning standard classification specified for the observation session.

12. The method of claim 1, wherein the action comprises offering a digital reward to one or more of the students.

13. The method of claim 1, further comprising:
   monitoring a document object model of webpages displayed on the respective student device to detect the respective student's answers to questions presented on the webpages; and
   based on the monitoring, generating one or more observations.

14. The method of claim 13, further comprising:
   injecting one or more interactive elements into the document object model.

15. One or more computer storage media storing computer executable instructions which when executed implement an education system that performs a method for AI-assisted classroom management with real-time observations, monitoring and intervention, the method comprising:

receiving, via a teacher AI interface of the educational system, a request to initiate an observation session, the request specifying a learning standard classification of a learning standard for the observation session;

in response to the request, capturing, by a student AI component of the educational system that is executed on each of a plurality of student devices, content on the respective student device during the observation session, wherein capturing the content on the respective student device comprises capturing screenshots;

sending, by the student AI component executed on each of the plurality of student devices, an application programming interface (API) request containing the captured content to an API server;

evaluating, by the API server, the captured content for each of the students in accordance with a learning standard to define a learning standard classification of the captured content for each of the students, wherein evaluating the captured content for each of the students comprises extracting text from the screenshots, creating a prompt containing the extracted text and instructions requesting a classification of the extracted text in accordance with the learning standard, submitting the prompt to a large language model (LLM), and receiving, from the LLM, the classification of the extracted text in accordance with the learning standard, and wherein defining the learning standard classification of the captured content for each of the students comprises defining the learning standard classification of the captured content for each student based on the respective classification of the extracted text received from the LLM;

generating a status for each of the students by comparing the learning standard classification of the captured content for each of the students to the learning standard classification specified for the observation session;

evaluating the status for each of the students against one or more rules;

based on the evaluation, generating an observation; and triggering, via the teacher AI interface, an action associated with the observation, wherein the action causes an AI tutor of the student AI component to redirect a student interface on the respective student device to content corresponding to the learning standard classification specified for the observation session.

16. One or more computer storage media storing computer executable instructions which when executed implement an education system that performs a method for AI-assisted classroom management with real-time observations, monitoring and intervention, the method comprising:

receiving, via a teacher AI interface of the educational system, a request to initiate an observation session, the request specifying a learning standard classification of a learning standard for the observation session;

in response to the request, capturing, by a student AI component of the educational system that is executed on each of a plurality of student devices, content on the respective student device during the observation session;

sending, by the student AI component executed on each of the plurality of student devices, an application programming interface (API) request containing the captured content to an API server;

evaluating, by the API server, the captured content for each of the students in accordance with a learning standard to define a learning standard classification of the captured content for each of the students, wherein evaluating the captured content for each of the students comprises creating a prompt containing the captured content and instructions requesting a classification of the captured content in accordance with the learning standard, submitting the prompt to a large language model (LLM), and receiving, from the LLM, the classification of the captured content in accordance with the learning standard, and wherein defining the learning standard classification of the captured content for each of the students comprises defining the learning standard classification of the captured content for each student based on the respective classification of the captured content received from the LLM;

generating a status for each of the students by comparing the learning standard classification of the captured content for each of the students to the learning standard classification specified for the observation session;

evaluating the status for each of the students against one or more rules;

based on the evaluation, generating an observation; and triggering, via the student AI component, an action associated with the observation.

17. The computer storage media of claim 16, wherein the action causes an AI tutor of the student AI component to redirect a student interface on the respective student device to content corresponding to the learning standard classification specified for the observation session.

18. The computer storage media of claim 16, wherein the captured content includes screenshot.

19. The computer storage media of claim 18, wherein the prompt includes text extracted from the screenshots.

20. The computer storage media of claim 16, wherein the action comprises injecting one or more interactive elements into a document object model on the respective student device.

* * * * *